US012670446B2

(12) United States Patent
Fridgen et al.

(10) Patent No.: US 12,670,446 B2
(45) Date of Patent: *Jun. 30, 2026

(54) METHODS AND SYSTEMS FOR SUB-FIELD SOIL NUTRIENT MANAGEMENT

(71) Applicant: ADVANCED AGRILYTICS HOLDINGS, LLC, Indianapolis, IN (US)

(72) Inventors: Jon J. Fridgen, Lancaster, KY (US); William Kess Berg, Clayton, IN (US); Aaron W. Gault, Greensburg, IN (US)

(73) Assignee: ADVANCED AGRILYTICS HOLDINGS, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,729

(22) Filed: Apr. 22, 2024

(65) Prior Publication Data

US 2024/0354653 A1 Oct. 24, 2024

Related U.S. Application Data

(63) Continuation of application No. 18/136,186, filed on Apr. 18, 2023, now Pat. No. 12,008,447.

(51) Int. Cl.
*G06N 20/00* (2019.01)
*A01C 21/00* (2006.01)
*A01G 7/00* (2006.01)

(52) U.S. Cl.
CPC ........... *G06N 20/00* (2019.01); *A01C 21/005* (2013.01); *A01C 21/007* (2013.01); *A01G 7/00* (2013.01)

(58) Field of Classification Search
CPC ..... A01C 21/005; A01C 21/007; A01C 21/00; A01G 7/00; G06N 20/00
See application file for complete search history.

(56) References Cited

U.S. PATENT DOCUMENTS

| 12,008,447 B1 * | 6/2024 | Fridgen ................... A01G 7/00 |
| 2003/0019408 A1 | 1/2003 | Fraisse et al. |

(Continued)

OTHER PUBLICATIONS

Debnath S, Paul M, Debnath T. Applications of LiDAR in Agriculture and Future Research Directions. J Imaging. Feb. 24, 2023;9(3): 57. doi: 10.3390/jimaging9030057. PMID: 36976108; PMCID: PMC10052112.*

(Continued)

*Primary Examiner* — Christopher J. Novosad
(74) *Attorney, Agent, or Firm* — MARSHALL, GERSTEIN & BORUN LLP

(57) ABSTRACT

A computing system includes a processor and a memory having instructions stored thereon that, when executed by the one or more processors, cause the computing system to: determine critical level data, generate a spatial critical level map, generate soil nutrients recommendations data, and cause the spatial critical level map and the soil nutrients recommendations data to be displayed. A method includes determining critical level data, generating a spatial critical level map, generating soil nutrients recommendations data, and causing the spatial critical level map and the soil nutrients recommendations data to be displayed. A non-transitory computer readable medium includes program instructions that when executed by one or more processors, cause a computer to determine critical level data, generate a spatial critical level map, generate soil nutrients recommendations data, and cause the spatial critical level map and the soil nutrients recommendations data to be displayed.

20 Claims, 10 Drawing Sheets
(4 of 10 Drawing Sheet(s) Filed in Color)

(56) References Cited

U.S. PATENT DOCUMENTS

| 2013/0231968 A1 | 9/2013 | Willness |
| 2020/0074023 A1 | 3/2020 | Nizami et al. |
| 2020/0154629 A1 | 5/2020 | Holoubek et al. |
| 2022/0369535 A1 | 11/2022 | Berg et al. |

OTHER PUBLICATIONS

Mandu Moses, Lidar Applications In Agriculture, https://lidarandradar.com/lidar-applications-in-agriculture/ (Jan. 25, 2021).*
FieldBee > Blog > What Is RTK and Why Use It in Agriculture? https://www.fieldbee.com/blog/what-is-the-rtk-network-and-how-is-it-beneficial-for-farmers (May 13, 2022).*
International Application No. PCT/US2024/025094, International Search Report and Written Opinion, mailed Aug. 26, 2024.
Soil Sci., "A Nutrient Mobility Concept of Soil-Plant Relation-ships." Roger H. Bray, vol. 104, pp. 9-22 (1954).

* cited by examiner

300

25 PPM

310

320

330

500

SWI 7

72% OF CRITICAL LEVEL K

95% OF CRITICAL LEVEL K

600

602 — DETERMINE GEOGRAPHIC FIELD BOUNDARY

604 — OBTAIN TOPOGRAPHIC DATA CORRESPONDING TO FIELD BOUNDARY

606 — GENERATE DIGITAL ELEVATION MODEL INCLUDING DERIVATIVE DATA

608 — DETERMINE CRITICAL LEVEL DATA FOR AREA OF THE LAND

610 — GENERATE SOIL NUTRIENTS RECOMMENDATIONS DATA

METHODS AND SYSTEMS FOR SUB-FIELD SOIL NUTRIENT MANAGEMENT

CROSS-REFERENCE TO RELATED APPLICATIONS

This application is a continuation of application Ser. No. 18/136,186, entitled METHODS AND SYSTEMS FOR SUB-FIELD SOIL NUTRIENT MANAGEMENT, filed on Apr. 18, 2023, which is incorporated herein by reference in its entirety.

FIELD OF THE DISCLOSURE

The present disclosure is directed to methods and systems for improved sub-field nutrient management practices, and more particularly, to methods and systems for generating nutrient application rate recommendations across a variable grid based on improved critical level computation techniques.

BACKGROUND

Nutrient management is an essential part of any agricultural practice. Decades ago, mechanisms of nutrient cycling, soil element interactions and ultimately plant availability became known and began being used by agronomists and growers to support nutrient management, crop growth and improved nutrient efficiency. For example, the relationship between nutrient mobility and nutrient availability was described by Bray, who wrote that "[a] s the mobility of a nutrient in the soil decreases, the amount of that nutrient needed in the soil to produce a maximum yield (the soil nutrient requirement) increases from a variable 'net' value, determined principally by the magnitude of the yield and the optimum percentage composition of the crop, to an amount whose value tends to be a constant." Bray, Roger H.; "A nutrient mobility concept of soil-plant relationships"; Soil Sci., Vol. 104. at 9-22 (1954).

For several decades, agronomists and farmers alike (e.g., in the U.S. Midwest region) have used static rules for managing nutrient concentration levels in their soils. These rules of management have been primarily influenced by utilizing various state or university standards. Specifically, soil test response relationships have been applied at the state level, with the rationale that differing environments will require different correlation and/or calibration responses citing primarily soil mineralogical/chemical influences and also, to a lesser extent, climatological differences that influence nutrient availability.

Most of the conventional processes for recommending phosphorus/potassium typically using equations developed and propagated by land grant universities stipulate that once nutrient levels surpass a global critical level value, no additional yield response can be had via the application of additional nutrients.

Sometimes, instead of a state-level profile, "unique" geographic area profiles have also been used, wherein the "unique" area is a similarly large area (e.g., thousands of square miles).

These guidelines, which provide broad and generic geographic specific nutrient management guidance, have been widely adopted across much of the United States to manage soil fertility on a field-by-field basis to ensure that nutrients are not being over- or under-applied by producers. Additionally, these guidelines have served as a rough guide for sufficient nutrient concentration levels to sustain crop yield.

However, significant sub-field differences that impact nutrient availability have not been addressed. Many fertilizer guidelines, developed for whole-field recommendations, have simply been applied at an increasingly granular level for adaptation of increased concentrations of soil sampling programs. For example, the agricultural industry has used the Soil Survey Geographic Database (SSURGO) to identify soil composition, water holding capacity, frequency of flooding, etc. that can be used to identify areas of risk for nutrient loss. These acres are designated as lower in landscape position and closer to the water table of the soil as "at risk" for nutrient loading. Thus, critical values for managing soil fertility are treated same across acres, when there is in fact extensive variability between acres. Further, some of these equations naively assume that there is a single critical level for all nutrients (e.g., for both phosphorus and potassium).

Yet, soil moisture status is never equal for each acre within the geography defined by an agricultural field boundary. Differences in plant available water (i.e., the difference between field capacity and permanent wilting point) across differing soil textural classes is somewhat accounted for with regional fertility guidelines, but differences in elevation, elevation derivatives, and other attributes such as infiltration rate remain unaddressed. All of these sub-field differences influence soil moisture content and nutrient mobility. Further, conventional nutrient management guidelines do not account for yield based on observed yield values.

While nutrient management has significantly evolved over the last few years, and site-specific technologies have emerged to further nutrient efficiencies due to increased granularity of assessment and knowledge of nutrient concentration and crop requirements/response, these two areas of study have been examined independently without integrating known mechanisms defined by either area of study.

Accordingly, there is an opportunity for platforms and technologies to combine traditional nutrient recommendation methodology and new learnings of describing sub-field environmental factors influencing nutrient movement, to determine hyper-local recommendations.

BRIEF SUMMARY

In an aspect, a computing system for generating improved soil nutrient recommendations data includes one or more processors; and a memory having instructions stored thereon that, when executed by the one or more processors, cause the computing system to: (i) determine, based on derivative data included in a digital elevation model corresponding to an area of land within a geographic field boundary, critical level data for the area of land; (ii) generate, based on the critical level data, a spatial critical level map for the area of land; (iii) generate, using a model that receives the critical level data as input, the soil nutrients recommendations data; and (iv) cause the spatial critical level map and the soil nutrients recommendations data to be displayed on a graphical user interface of an output device.

In another aspect, a computer-implemented method for generating soil nutrients recommendation data includes (i) determining, based on derivative data included in a digital elevation model corresponding to an area of land within a geographic field boundary, critical level data for the area of land; (ii) generating, based on the critical level data, a spatial critical level map for the area land; (iii) generating, using a model that receives the critical level data as input, the soil nutrients recommendations data; and (iv) causing the spatial critical level map and the soil nutrients recommendations data to be displayed on a graphical user interface of an output device.

In yet another aspect, a non-transitory computer readable medium includes program instructions that when executed by one or more processors, cause a computer to: (i) determine, based on derivative data included in a digital elevation model corresponding to an area of land within a geographic field boundary, critical level data for the area of land; (ii) generate, based on the critical level data, a spatial critical level map for the area of land; (iii) generate, using a model that receives the critical level data as input, the soil nutrients recommendations data; and (iv) cause the spatial critical level map and the soil nutrients recommendations data to be displayed on a graphical user interface of an output device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
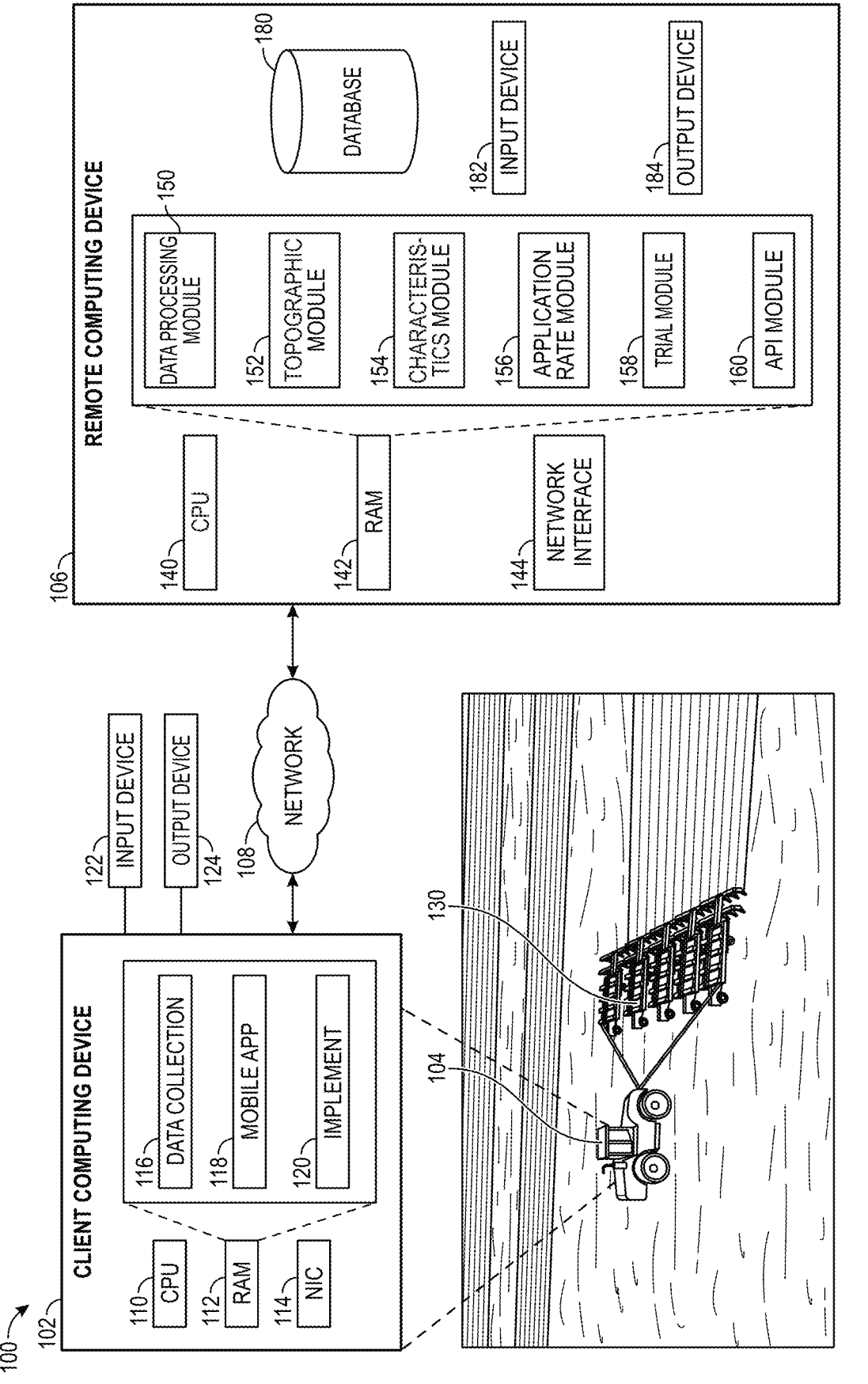
FIG. 1 depicts an exemplary computing environment in which the techniques disclosed herein may be implemented, according to an aspect.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Overview

The present aspects may relate to, inter alia, methods and systems for improved hyper-local nutrient management practices, and more particularly, to methods and systems for generating nutrient application rate recommendations across a variable grid based on improved critical level computation techniques.

The present techniques provide methods and systems for improved traditional nutrient recommendation methodology using techniques for describing sub-field environmental factors influencing nutrient movement.

As discussed above, conventional nutrient management practices apply one-size-fits-all guidelines that were developed to describe state-level agricultural areas or areas of similar geographic scope. These guidelines fail to account for differences in plant essential nutrient availability (as impacted by plant available water) to maximize efficiency (increased yield along with decreased nutrient loss).

Soil temperature, rainfall, and landscape position all have profound effects on nutrient utilization and uptake. Given a uniform concentration of nutrients in the soil, a plant will respond differently depending on where it stands in the landscape. This can have major consequences for the grower if plant density and soil fertility are not managed together at the sub-field level. In some cases, while soil texture and chemical differences are known to impact plant available nutrient, availability and/or loss may be predominantly influenced by soil moisture status.

As noted above, Bray posited that decreased mobility leads to an increase in nutrient amount required for maximum yield. Thus, in sub-field environments with less water-availability, fertilizer concentration is of utmost importance. Inversely, in sub-field environments with greater water-availability, a lower fertilizer concentration is sufficient due to the increased efficiency of diffusion.

For example, it has been researched and proven that high percentages of phosphorus and potassium are taken up by a plant through diffusion. It has also been researched and proven that there is a near direct correlation between water availability and diffusion. For example, if water availability is reduced by 75%, then diffusion rates are reduced by nearly 75%; if diffusion rates are reduced by nearly 75%, then Phosphorus and Potassium concentrations (as well as those of other immobile nutrients) are reduced by nearly 75%.

The present techniques are directed to taking a more dynamic approach to managing soil fertility in a site-specific manner. Instead of using the same static critical level for every acre like most state and university recommendations, the present techniques are directed to generating site-specific critical values across a variable grid that allow growers, agronomists and others to better address environmental factors affecting plant growth through more efficient use of fertilizer applications. Each grid cell in the variable grid may be assigned one or more respective critical values.

Empirical testing has demonstrated that performing an "environmental adjustment" based on grid-cell critical values has proven to have had a positive influence on yield, particularly on historically net-loss acres. At the same time, this approach has equated to a greater nutrient use efficiency on the most productive (non-water-limited) acres.

Overall, sustainability is positively affected, regardless of baseline agricultural viability of the farm's acres.

Specifically, empirical testing have demonstrated high yields while keeping the critical values for minerals (e.g., Phosphorus) at the lower end of state and university recommended values in non-water limiting environments, while increasing those critical levels in stressful water-limited environments. This represents an advantageous improvement in the functioning of crop nutrient uptake, or an improvement to other technology or technical field, specifically that of precision agriculture methods and systems.

The present techniques include additional sustainability benefits. For example, Phosphorus run-off is known to occur most frequently on the acres closest to the watershed. Therefore, applying unnecessary amounts of Phosphorus on these environments can not only result in inefficient use of fertilizer expenditures but more importantly, contribute to nutrient runoff. On the other hand, by applying higher concentrations of fertilizer on water-limited environment's furthest from the watertable the present techniques utilize higher rates of fertilizer more efficiently while reducing environmental run-off at the same time.

Yield results over time have proven that in a dry year, higher rates of fertilizer on the water-limited acre (upper portion of the field landscape), had a significant advantage compared average to below average fertility in these same environments. Alternatively, in a wet year when the high ground does much of the heavy lifting in terms of yield contribution, higher concentrations of fertilizer not only resulted in good yields, but rather took yields to another level in these respective environments.

Exemplary Critical Level Computations

As discussed, conventionally, critical levels have been defined by a blanket recommendation critical level. For example, the Tri-State Fertilizer Guideline P/K recommendation equation has been used to set critical levels for potassium and phosphorus, defined as $$\text{Application Rate} = ((\text{Critical Level} - \text{Soil Test Level}) \times \text{Buffering Factor}) + (\text{Yield} \times \text{Removal})$$

Further, as discussed, applying such a formula grossly across an entire farm or acres or larger geographic region (e.g., a state) neglects in-field variability.

For example, consider a farm field having a first sub-field region of Silty Clay Loam at 0-1%, and a second sub-field region of Silty Clay Loam at 3% slope. In this example, the two sub-field regions may be separated by a small distance (e.g., 30 yards or less). Conventional critical level guidelines consider these two regions as identical for purposes of establishing a soil test critical level. However, these two regions will mineralize various nutrients at different rates, for different total amounts.

Therefore, the present techniques may include identifying critical values for plant growth nutrients (e.g., phosphorus and/or potassium), while addressing the influence of factors such as soil landscape position within the field, water availability within the field, etc.

The present techniques improve upon existing guidelines (e.g., the Tri-State Fertilizer Guidelines). In some aspects, critical levels of nutrients (e.g., phosphorus and/or potassium) are spatially defined by understanding yearly/seasonal differences in soil moisture status throughout the growing season.

In general, as predicted risk of reduced plant available water for a particular acre increases, critical level may be increased. Regardless of crop, phosphorus critical levels may range from 15 ppm to 30 ppm and potassium may be environmentally adjusted similar to phosphorus after the cation exchange capability portion of critical level determination is calculated using the Tri-State Fertilizer Guidelines (or another guideline(s)).

Specifically, the present techniques may apply Geographic Information Systems (GIS) to gain a sub-field understanding of soil moisture differences and to facilitate field modeling/prediction. Further, the present techniques may apply chemical soil test estimates to aid in understanding (e.g., separation and contribution of organic and mineral fractions for cation exchange capacity better guides potassium availability). The present techniques may apply infiltration rate (e.g., spatially estimated from planter downforce or soil resistance to planting depth), slope, catchment area, and other elevation (topographic) derivatives to determine information regarding water movement and deposition that should be accounted for in improved nutrient management. None of these attributes utilized singly provide much guidance but utilized in conjunction, they provide granular insight of the risks of nutrient availability and/or loss. Thus, chemical, physical and soil components may be introduced initially, followed by assessments of soil moisture content and nutrient risk to determine nutrient critical levels.

The present techniques improve upon existing guidelines (e.g., the Tri-State Fertilizer Guideline P/K recommendation equation) by using past (i.e., historical) spatial yield data (e.g., from a well-calibrated combine monitor). Specifically, this historical yield data may replace traditional yield goals for a field.

The insight motivating the usage of historical yield data is that the second half of the Tri-State Fertilizer equation (Yield×Removal) accounts for the actual removal of previous crop, and not a hope of future yield, whereas the initial half of a formula such as the Tri-State Fertilizer Guideline (assessing soil test level versus the critical level and adjusting accordingly) is responsible for supporting the future crop.

It should be appreciated that some nutrient values (e.g., phosphorus and potassium) may be computed independently. Thus, their application rates may be computed independently. The format of equations used to compute these values may be similar, but the amount of amount of potassium applied to raise the soil test level a given level (e.g., one part per million) may be different from the amount of phosphorus applied to raise soil test one part per million of phosphorus. Thus, some of the structural coefficients in the equation may be different.

In some examples, crop differences may affect application rates. For example, corn may use more phosphorus than potassium, and soy may use more potassium than phosphorus. Thus, in some aspects, a grower may attempt to maximize fertilizer application by spreading phosphorus before a corn crop and then spreading potassium before a soybean crop. Therefore, the present techniques may be configured to make crop-specific recommendations that differ from year-to-year, or season-to-season, based on planting schedules. In some aspects, the grower's schedule may be accessed via the application rate module 156.

Assuming that traditional critical levels (i.e., the value where optimum response will occur) are correct, values above a known critical level will not increase the probability of increased performance, while values below will increase performance only when additional product is added. Thus, using conventional assessments of soil test level compared to critical level will only recommend the application of nutrient to the extent of reaching a soil level where the highest probability of response is found and decreasing as soil test values approach the critical level.

The present techniques improve upon these conventional techniques by placing more weight on correctly assessing the critical levels in a spatial setting, advantageously leading to increased nutrient availability while also limiting loss potential.

Further, examples such as the drought year of 2012 demonstrate that yield is an outcome and should not be treated as a goal. In 2012, an individual may have set a static yield goal the previous Fall or Spring and used that static yield goal as an input parameter to a guideline, to determine a nutrient application rate recommendation. However, the yield outcome in the Fall of 2012 was =<60% of the goal set prior to crop establishment.

Furthermore, the identification of the crop that generated the yield data used for the modeling may be analyzed. This is because the amount of nutrients removed by some crops (e.g., corn) is different than what is removed by others (e.g., soybean). Thus, the actual removal discussed above may be scaled accordingly.

Using idealized goals across years instead of actual removal numbers may lead to over-application of nutrient or under-application of nutrient. For example, if a yield goal is 250 bushels to the acre, and in 2012, the actual yield is 150 bushels per acre, adding more fertilizer at an idealized rate would be a gross over-application, because the low yield did not result in the estimated removal. Thus, the present techniques may include utilization of actual removal numbers, instead of static goals. The present techniques improve upon existing rate application determination systems by protecting against outcomes based upon unrealistic assumptions, while optimizing crop performance with little to no nutrient loss risk.

Exemplary Computing Environment

FIG. 1 depicts an exemplary computing environment 100 in which the techniques disclosed herein may be implemented, according to an aspect.

The environment 100 includes a client computing device 102, an implement 104, a remote computing device 106, and a network 108. Some aspects may include a plurality of client computing devices 102, a plurality of implements, and/or a plurality of remote computing devices 106. Multiple and/or separate networks may communicatively couple different components of the environment 100, such as the client computing device 102 and the implement 104, and/or the client computing device 102 and the remote computing device 106.

The client computing device 102 may be an individual server, a group (e.g., cluster) of multiple servers, or another suitable type of computing device or system (e.g., a collection of computing resources). For example, the client computing device 102 may be a mobile computing device (e.g., a server, a mobile computing device, a smart phone, a tablet, a laptop, a wearable device, etc.). In some aspects the client computing device 102 may be a personal portable device of a user. In other aspects the client computing device 102 may be temporarily or permanently affixed to the implement 102. For example, the client computing device 102 may be the property of a customer, an agricultural analytics (or "agri-lytics") company, an implement manufacturer, etc.

The client computing device 102 includes a processor 110, a memory 112 and a network interface controller (NIC) 114. The processor 110 may include any suitable number of processors and/or processor types, such as CPUs and one or more graphics processing units (GPUs). Generally, the processor 110 is configured to execute software instructions stored in a memory 112. The memory 112 may include one or more persistent memories (e.g., a hard drive/solid state memory) and stores one or more set of computer executable instructions/modules, including a data collection module 116, a mobile application module 118, and an implement control module 120, as described in more detail below.

More or fewer modules may be included in some aspects. The NIC 114 may include any suitable network interface controller(s), such as wired/wireless controllers (e.g., Ethernet controllers), and facilitate bidirectional/multiplexed networking over the network 108 between the client computing device 102 and other components of the environment 100 (e.g., another client computing device 102, the implement 104, the remote computing device 106, etc.).

The one or more modules stored in the memory 112 may include respective sets of computer-executable instructions implementing specific functionality. For example, in an aspect, the data collection module 116 includes a set of computer-executable instructions for collecting a machine data set from an implement (e.g., the implement 104). The machine data collection module 116 may include a respective set of instructions for retrieving/receiving data from a plurality of different implements. For example, a first set of instructions may be configured to retrieve/receive machine data from a first tractor manufacturer, while a second set of instructions is for retrieving/receiving machine data from a second tractor manufacturer.

In another aspect, the first and second set of instructions may be for, respectively, receiving/retrieving data from tillage equipment and/or a harvester. Of course, some libraries of instructions may be provided by the manufacturers of various implements and/or attachments and may be loaded into the memory 112 and used by the data collection module 116.

The data collection module 116 may retrieve/receive machine data from a separate hardware device (e.g., a client computing device 102 that is part of the implement 104) or directly from one or more of the sensors of the implement 104 and/or one or more of the attachments 130 coupled to the implement 104, if any.

The machine data may include any information generated by the client computing device 102, the implement 104, and/or the attachments 130. For example, the machine data may include sensor measurements of planter downforce, soil resistance to planting depth, engine load data, fuel burn data, draft, fuel consumption, wheel slippage, etc. The machine data may include application/treatment rates and a geographic identifier (e.g., one or more location coordinates). The machine data may include one or more time series, such that one or more measured values are represented in a single data set at a common interval (e.g., one-second). For example, the machine data may include a first time series of fertilizer application rate at a one-second interval, a second time series of seed application, etc.

The machine data may include respective location data. For example, the client computing device 102 may add location metadata to the machine data, such that the machine data reflects an absolute and/or relative geographical position (i.e., location, coordinate, offset, heading, etc.) of the client computing device 102, the implement 104, and/or the attachments 130 within the agricultural field at the precise moment that the client computing device 102 captures the machine data. Thus, a time series may include a respective location for each element within the time series.

Some sensors and/or agricultural equipment may generate machine data that is received by the client computing device 102 that already includes location metadata added by the sensors and/or agricultural equipment. In an aspect wherein the machine data comprises a time series, each value of the time series may include a respective geographic metadata entry.

The data collection module 116 may receive and/or retrieve the machine data via an API through a direct hardware interface (e.g., via one or more wires) and/or via a network interface (e.g., via the network 108). The data collection module 116 may collect (e.g., pull the machine data from a data source and/or receive machine data pushed by a data source) at a predetermined time interval. The time interval may be of any suitable duration (e.g., once per second, once or twice per minute, every 10 minutes, etc.). The time interval may be short, in some aspects (e.g., once every 10 milliseconds). The data collection module 116 may include instructions for modifying and/or storing the machine data. For example, the data collection module 116 may parse the raw machine data into a data structure. The data collection module 116 may write the raw machine data onto a disk (e.g., a hard drive in the memory 112). In some aspects, the data collection module 116 may transfer the raw machine data, or modified machine data, to a remote computing system/device, such as the remote computing device 106. The transfer may, in some aspects, take the form of an SQL insert command. In effect, the data collection module 116 performs the function of receiving, processing, storing, and/or transmitting the machine data. In some aspects, the data collection module 116 may retrieve an identifier (e.g., a treatment identifier, a trial identifier, etc.) from another module. The data collection module 116 may merge the identifier into the machine data and associate the identifier with the collected machine data.

The mobile application module 118 may include computer-executable instructions that display one or more graphical user interfaces (GUIs) on the output device 124 and/or receives user input via the input device 122. For example, the mobile application module 118 may correspond to a mobile computing application (e.g., an Android, iPhone, or other) computing application of an agrilytics company. The mobile computing application may be a specialized application corresponding to the type of computing device embodied by the client computing device 102. For example, in aspects where the client computing device 102 is a mobile phone, the mobile application module 118 may correspond to a mobile application downloaded for iPhone. When the client computing device 102 is a tablet, the mobile application module 118 may correspond to an application with tablet-specific features. Exemplary GUIs that may be displayed by the mobile application module 118, and with the user may interact, are discussed below.

The mobile application module 118 may include instructions for receiving/retrieving mobile application data from the remote computing device 106. In particular, the mobile application module 118 may include instructions for transmitting user-provided login credentials, receiving an indication of successful/unsuccessful authentication, and other functions related to the user's operation of the mobile application. The mobile application module 118 may include instructions for receiving/retrieving, rendering, and displaying visual maps in a GUI. Specifically, the application module 118 may include computer-executable instructions for displaying one or more map layers in the of the client computing device 102. For example, the map layers may be used to depict comparisons of one or more fields generated using the present nutrient application rate recommendation techniques.

The implement control module 120 includes computer-executable instructions for controlling the operation of an implement (e.g., the implement 104) and/or the attachments 130. The implement control module 120 may control the implement 104 while the implement 104 and/or attachments 130 are in motion (e.g., while the implement 104 and/or attachments 130 are being used in a farming capacity). For example, the implement control module 120 may include an instruction that, when executed by the processor 110 of the client computing device 102, causes the implement 104 to accelerate or decelerate. In some aspects, the implement control module 120 may cause one of the attachments 130 to raise or lower the disc arm of tillage equipment, or to apply more or less downward or upward pressure on the ground. The implement 130 may control an application rate of one or more nutrients (e.g., phosphorus, nitrogen, etc.) in response to an agricultural prescription. Herein, an "agricultural prescription" or "prescription" is defined as a set of computer-executable instructions that may be loaded into the memory of a device (e.g., the client computing device 102) and executed to cause one or more particular agricultural operations to occur. Agricultural prescriptions are often encoded in common data formats in the agricultural industry.

Practically, the implement control module 120 has all of the control of the implement 104 and/or attachments 130 as does the human operator, and more. The implement control module 120 may include a respective set of instructions for controlling a plurality of implements. For example, a first set of instructions may be configured to control an implement of a first tractor manufacturer, while a second set of instructions is configured to control an implement of a second tractor manufacturer.

In another aspect, the first and second set of instructions may be configured to control, respectively, tillage equipment and/or a harvester. Of course, many configurations and uses are envisioned beyond those provided by way of example. The control module 120 may include computer-executable instructions for executing one or more agricultural prescriptions with respect to a field. For example, the control module 120 may execute an agricultural prescription that specifies, for a given agricultural field, a path for the implement 104 to follow within the field, and a varying application rate of a chemical (e.g., a fertilizer, an herbicide, a pesticide, etc.) or a seed to apply at various points along the path. The control module 120 may analyze the current location of the implement 104 and/or the attachments 130 in real-time (i.e., as the control module 120 executes the agricultural prescription). The computer-executable instructions for executing the one or more agricultural prescriptions may be based on critical level values. In some aspects, the computer-executable instructions may directly analyze the output of a critical level/application rate formula determine one or more actions for the implement 104 to take.

In some aspects, one or more components of the computing device 102 may be embodied by one or more virtual instances (e.g., a cloud-based virtualization service). In such cases, one or more client computing device 102 may be included in a remote data center (e.g., a cloud computing environment, a public cloud, a private cloud, etc.). For example, a remote data storage module (not depicted) may remotely store data received/retrieved by the computing device 102. The client computing device 102 may be configured to communicate bidirectionally via the network 108 with the implement 104 and/or an attachments 130 that may be coupled to the implement 104. The implement 104 and/or the attachments 130 may be configured for bidirectional communication with the client computing device 102 via the network 108.

The client computing device 102 may receive/retrieve data (e.g., machine data) from the implement 104, and/or the client computing device 102 may transmit data (e.g., instructions) to the implement 104. The client computing device 102 may receive/retrieve data (e.g., machine data) from the attachments 130, and/or may transmit data (e.g., instructions) to the attachments 130. The implement 104 and the attachments 130 will now be described in further detail.

The implement 104 may be any suitable powered or unpowered equipment/machine or machinery, including without limitation: a tractor, a combine, a cultivator, a cultipacker, a plow, a harrow, a stripper, tillage equipment, a planter, a baler, a sprayer, an irrigator, a sorter, a harvester, etc. The implement 104 may include one or more sensors (not depicted) and the implement 104 may be coupled to one or more attachments 130. For example, the implement 104 may include one or more sensors for measuring respective implement values of liquid application rate, seed application rate, engine load data, fuel burn data, draft sensing, fuel consumption, wheel slippage, etc. Many aspects including more or fewer sensors measuring more, or fewer implement values are envisioned. The implement 104 may be a gas/diesel, electric, or hybrid vehicle operated by a human operator and/or autonomously (e.g., as an autonomous/driverless agricultural vehicle).

The attachments 130 may be any suitable powered or unpowered equipment/machinery permanently or temporarily affixed/attached to the implement 104 by, for example, a hitch, yoke or other suitable mechanism. The attachments 130 may include any of the types of equipment that the implement 104 may comprise (e.g., tillage equipment). The attachments 130 may include one or more sensors (not depicted) that may differ in number and/or type according to the respective type of the attachments 130 and the particular aspect/scenario. For example, tillage attachments 130 may include one or more soil depth sensors. It should be appreciated that many attachments 130 sensor configurations are envisioned. For example, the attachments 130 may include one or more cameras. The attachments 130 may be connected to the implement 104 via wires or wirelessly, for both control and communications. For example, attachments 130 may be coupled to the client computing device 102 of the implement 104 via a wired and/or wireless interface for data transmission (e.g., cellular data via 4G/5G, IEEE 802.11, Wi-Fi, etc.) and main/auxiliary control (e.g., 7-pin, 4-pin, etc.). The client computing device 102 may communicate bidirectionally (i.e., transmit data to, and/or receive data from) with the remote computing device 106 via the network 108.

The client computing device 102 includes an input device 122 and an output device 124. The input device 122 may include any suitable device or devices for receiving input, such as one or more microphone, one or more camera, a hardware keyboard, a hardware mouse, a capacitive touch screen, etc. The output device 124 may include any suitable device for conveying output, such as a hardware speaker, a computer monitor, a touch screen, etc. In some cases, the input device 122 and the output device 124 may be integrated into a single device, such as a touch screen device that accepts user input and displays output. The client computing device 102 may be associated with (e.g., leased, owned, and/or operated by) an agrilytics company.

The network 108 may be a single communication network or may include multiple communication networks of one or more types (e.g., one or more wired and/or wireless local area networks (LANs), and/or one or more wired and/or wireless wide area networks (WANs) such as the Internet). The network 108 may enable bidirectional communication between the client computing device 102 and the remote computing device 106, or between multiple client computing devices 102, for example.

The remote computing device 106 includes a processor 140, a memory 142, and a NIC 144. The processor 140 may include any suitable number of processors and/or processor types, such as CPUs and one or more graphics processing units (GPUs). Generally, the processor 140 is configured to execute software instructions stored in the memory 142. The memory 142 may include one or more persistent memories (e.g., a hard drive/solid state memory) and stores one or more set of computer executable instructions/modules, as discussed below. For example, the remote computing device 106 may include a data processing module 150, a topographic module 152, a characteristics module 154; and an application rate module 156.

The NIC 144 may include any suitable network interface controller(s), such as wired/wireless controllers (e.g., Ethernet controllers), and facilitate bidirectional/multiplexed networking over the network 106 between the remote computing device 106 and other components of the environment 100 (e.g., another remote computing device 106, the client computing device 102, etc.).

The one or more modules stored in the memory 142 may include respective sets of computer-executable instructions implementing specific functionality. For example, in an aspect, the data processing module 150 includes computer-executable instructions for receiving/retrieving data from the client computing device 102, the implement 104, and/or the attachments 130. For example, the data processing module 150 may include instructions that when executed by the processor 140, cause the remote computing device 106 to receive/retrieve machine data. The data processing module 150 may include further instructions for storing the machine data in one or more tables of the database 180. The data processing module 150 may store raw machine data, or processed data. The data processing module 150 may include instructions for processing the raw machine data to generate processed data. For example, the processed data may be data that is represented using data types of data of a programming language (e.g., R, C #, Python, JavaScript, etc.).

The data processing module 150 may include instructions for validating the data types present in the processed data. For example, the data processing module 150 may verify that a value is present (i.e., not null) and is within a particular range or of a given size/structure. In some aspects, the data processing module 150 may transmit processed data to/from an electronic database in response to a query, or request, from the client computing device 102. The data processing module 150 may transmit the processed data via HTTP or via another data transfer suitable protocol. In some aspects, the data processing module 150 may transform data received from the data collection module 116 of the client computing device 102. For example, the data processing module 150 may transform raw machine data into a spatial data format.

The topographic module 152 may include instructions for analyzing raw machine data and computing topographic data attributes. For example, the topographic module 152 may be configured to generate relative elevation and slope/soil wetness index (SWI) data based on raw machine data. The topographic module 152 may store topographic data attributes in an electronic database. The topographic module 152 may be configured to retrieve and/or provide topographic data to other modules in the remote computing device 106. The topographic data may take the form of raw data (e.g., a list of geographic coordinates and elevation in feet above sea level) or more complex data, such as an elevation map layer/spatial data file. The topographic module 152 may source elevation data from public sources, such as the United States Geological Survey (USGS) National Elevation Dataset (NED) database, SSURGO, LIDAR data available via state/county geospatial data clearinghouses, etc. In some aspects, the data processing module 150 may provide raw data to the topographic module 152, wherein instructions within the topographic module 152 infer the elevation of a particular plot of land by analyzing the raw data. The elevation data may be stored in a two-dimensional (2D) or three-dimensional (3D) data format, depending on the aspect and scenario.

The topographic module 152 may include instructions for determining/processing a field boundary, and for receiving/retrieving topographic data corresponding to that field boundary. The topographic data corresponding to the field boundary may be LIDAR data, as planted data (e.g., from real-time kinetic (RTK) elevation data), GPS data, as applied data, or any other suitable topographic data source.

The topographic module 152 may include computer-executable instructions for generating one or more map layers and/or one or more geospatial data files (e.g., shape-files). The topographic module 152 may store the generated map layers and/or geospatial files in an electronic database, and/or in the memory 142. The topographic module 152 may provide the geospatial files and/or map layers to other components of the environment 100, such as the client computing device 102. Specifically, the topographic module 152 may include an API endpoint that allows another application/module (e.g., the mobile application module 118 to submit a query/request to receive/retrieve one or more geospatial files and/or one or more map layers via the network 108.

The topographic module 152 may use existing standardized and/or proprietary software libraries to generate the maps and/or shape files. Further, the topographic module 152 may combine one or more data sets from an electronic database into a single map layer/geospatial file, or into multiple respective map layers. For example, the topographic module 152 may generate a composite geospatial data file that includes a first map layer representing a set of attributes belonging to a first field, and a second map layer representing a set of attributes belonging to a second field. The topographic module 152 may also generate multiple layers, wherein each corresponds to an underlying environmental attribute (e.g., a slope layer, an OM layer, a CEC layer, etc.). The layers may be transmitted to and displayed in user devices (e.g., the mobile computing device 102).

The modeling module 154 may store, retrieve, sort and refine a global list of underlying environmental characteristics. For example, the characteristics may include information such as soil organic matter, cation-exchange capacity, relative elevation, slope and secondary topographic attributes, precipitation patterns, solar radiation levels, evapotranspiration rates, etc. Those of ordinary skill in the art will appreciate that the characteristics provided as examples are a subset of the global list of underlying environmental characteristics, and the use of more characteristics is envisioned. The underlying environmental characteristics may be simple or compound. The modeling module 154 may also calculate derivatives of elevation data included in the topographic data. For example, the modeling module 154 may generate slope, SWI and catchment area, and then generate a spatial layer of soil test critical values which would then be utilized to define the mobility of nutrients across the field. In some aspects, the modeling module 154 may combine slope, SWI and catchment area to determine a moisture status that describes where water is moving within a geography of a field (e.g., on a hexagrid-by-hexagrid basis).

In some aspects, machine learning models/algorithms may be trained and operated to carry out the operations of the modules stored in the memory 142. For example, aspects may use supervised and unsupervised machine learning techniques, including classification, regression, clustering, dimensionality reduction (e.g., autoencoding), support vector machines, Bayesian networks, and/or neural networks (e.g., deep artificial neural networks, convolutional neural networks, etc.). In some aspects, machine learning may be used to predict critical values and/or application rates. In other aspects, machine learning algorithms may be utilized to characterize/predict plant water availability and the movement thereof within the geography defined by a field boundary.

The application rate module 156 may receive topographic information from the topographic module 152 (e.g., topographic data corresponding to a field boundary for example) and/or derivatives from the modeling module 154 and generate one or more critical levels and/or one or more application rate recommendations.

Specifically, the application rate module 154 may determine critical levels based on the moisture status of the sub-field (e.g., one or more hexagrid). The application rate may assign each hexagrid a critical level. The critical levels may be input as parameters into a fertilizer guideline formula (e.g., the Tri-State fertilizer guideline formula discussed above). Other formulas may be used (e.g., Illinois, Iowa, government models, etc.).

The application rate module 154 may also receive yield data, for example yield data generated by the data collection module 116. The application rate module 154 may use the yield data with the fertilizer guideline formula to estimate how much nutrient the crop removed from the field. When this estimation is known, it can be used to determine an amount needed to raise the crop (the critical level). Soil test information may also be received from the data collection module 116 or another source that indicates how much nutrient is currently available in the soil.

In some aspects, the modules 150-156 may be run in parallel, such that derivatives of elevation, critical levels, application rate computations are calculated in parallel, thereby greatly speeding up computations.

Figure 2A:
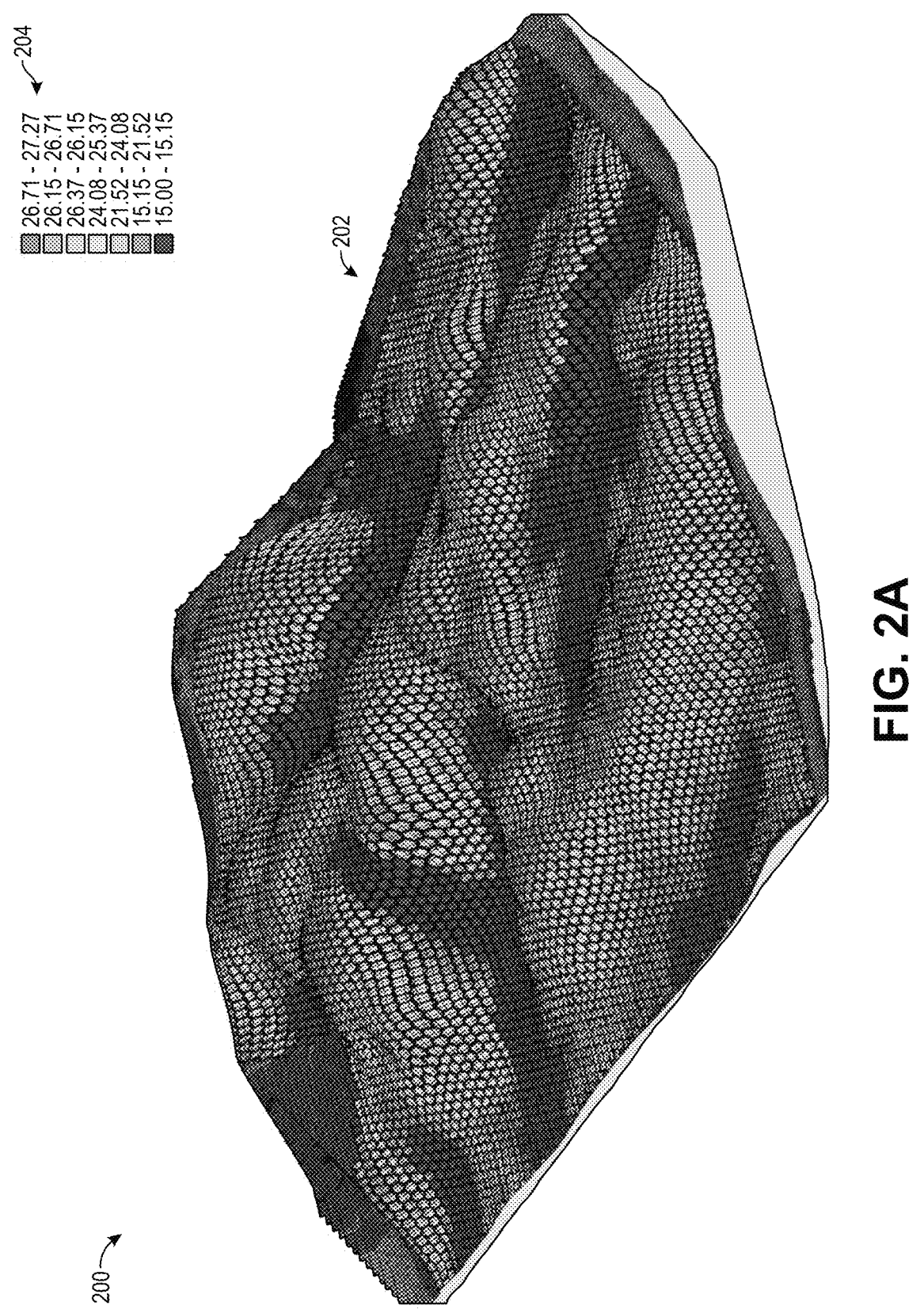
FIG. 2A depicts an example spatial critical phosphorus map, according to some aspects.
Figure 2B:
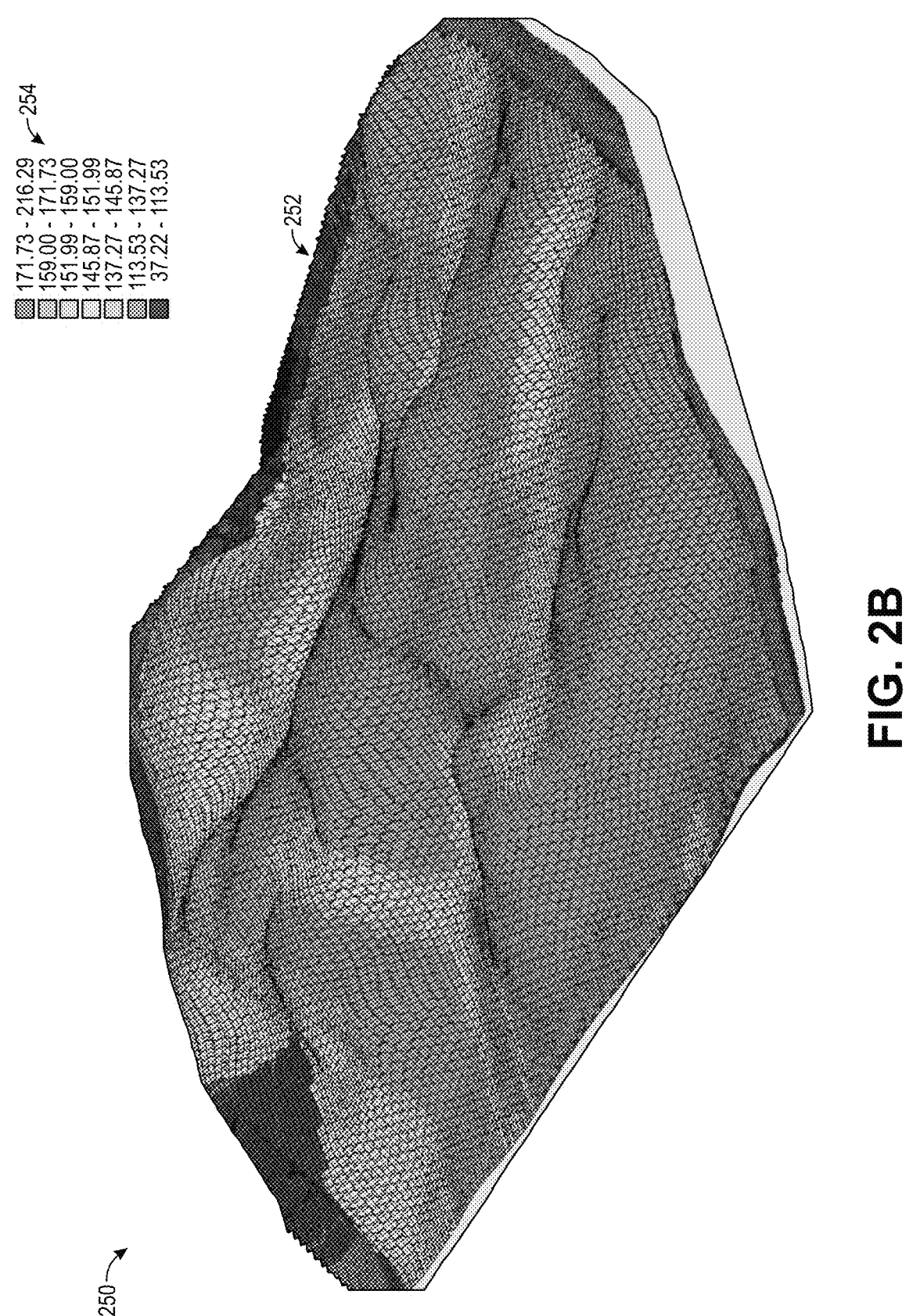
FIG. 2B depicts an example spatial critical potassium map, according to some aspects.

The application rate recommendations may be expressed as spatial data maps/files, as shown in FIG. 2A and FIG. 2B, for example. In some aspects, the application rate recommendations may be generated as, or include one or more agricultural prescriptions that may be executed to cause product to be applied at the sub-field level according to the application rates. The application rate module 156 may load a series of packages, depending on the programming language(s) used to implement the present techniques. For example, aspects may include a package for reading/writing to a shapefile, a package for performing spatial data analysis and modeling, a package for generating raster images, etc. The application rate module 156 may analyze as-planted data.

In some aspects, the application rate module 156 may determine a plurality of spatial critical levels for a field, wherein each respective critical level corresponds to a grid cell within the field. Examples of this are discussed below with respect to FIG. 2A, FIG. 2B, FIG. 3B and FIG. 3D.

Once the critical values and application rates are known, the present techniques may include additional module(s) that perform additional analytical functions using those values. For example, assuming a specific grower has purchased a finite arsenal of types of fertilizers that they can use, the present techniques may take as input the type of fertilizer that the grower has and predict how much fertilizer is required to achieve the critical levels. The generated critical values may also be utilized as input for other prescribed management such as variable rate seeding or starter fertilizer applications.

In some aspects, more/fewer modules may be included. For example, an API module 160 may be included, which accesses the results of application rate recommendations generated by the application rate module 156. Additionally, an agrilytics company may provide access to the API module 160 to a customer. The customer may collect environmental data and access the API, providing the collected environmental data as one or more input parameters. The API module 160 may return results that include application rate recommendations with respect to the agricultural field of the customer. In other aspects, the API may be used internally using customer field data or other field data. The present techniques may be used in conjunction with those described in U.S. Pat. No. 11,348,696 ("Environmental Matching Techniques"), incorporated hereby in its entirety.

For example, the present techniques may use environmental matching techniques to enable the grower to improve yield by matching one or more sub-field regions to other sub-field regions, which are part of different fields. This may allow the user to adjust seed, fertilizer, etc. recommendations based on historical or time-based growing season (e.g., year-over-year) analyses. In a first growing season, the grower may analyze the yield of a first field/environment. The grower may compare the performance of an aspect of the first field/environment in subsequent years/seasons and/ or across similar sub-fields located in different areas.

The remote computing device 106 may further include one or more database 180, an input device 182, and an output device 184. The database 180 may be implemented as a relational database management system (RDBMS) in some aspects. For example, the data store 140 may include one or more structured query language (SQL) database, a NoSQL database, a flat file storage system, or any other suitable data storage system/configuration. In general, the database 180 allows the client computing device 102 and/or the remote computing device 106 to create, retrieve, update, and/or retrieve records relating to performance of the techniques herein. For example, the database 180 may allow the client computing device 102 to store information received from one or more sensors of the implement 104 and/or the attachments 140.

The database 180 may store information received from users, via the input device 122 of the client computing device 102 and/or via the input device 182 of the remote computing device 106. The database 180 may be configured for the storage and retrieval of spatial data, in some aspects. The client computing device 102 may include a module (not depicted) including a set of instructions for querying an RDBMS, spatial data, etc. For example, the client computing device 102 may include a set of database drivers for accessing the database 180 of the remote computing device 106. In some aspects, the database 180 may be located remotely from the remote computing device 104, in which case the remote computing device 104 may access the database 180 via the NIC 112 and the network 106.

The input device 182 may include any suitable device or devices for receiving input, such as one or more microphone, one or more camera, a hardware keyboard, a hardware mouse, a capacitive touch screen, etc. The input device 182 may allow a user (e.g., a system administrator) to enter commands and/or input into the remote computing device 106, and to view the result of any such commands/input in the output device 184.

The output device 184 may include any suitable device for conveying output, such as a hardware speaker, a computer monitor, a touch screen, etc. The remote computing device 106 may be associated with (e.g., leased, owned, and/or operated by) an agrilytics company. As noted above, the remote computing device 106 may be implemented using one or more virtualization and/or cloud computing services. One or more application programming interfaces (APIs) may be accessible by the remote computing device 106.

Exemplary Computer-Implemented Graphical User Interface Aspects

FIG. 2A depicts an example spatial critical phosphorus map 200, according to some aspects. Herein "maps" may also be referred to as "spatial maps," "spatial layers," "shapefiles," etc. FIG. 2B depicts an example spatial critical potassium map 250, according to some aspects. The map 200 and the map 250 show the minimum level of nutrient required (phosphorus and potassium, respectively) for a given crop at every respective grid cell on the field. FIG. 2A depicts a legend 204, wherein the different values of phosphorus are represented such that the field variability can be easily understood by viewing the map 200. FIG. 2B depicts a legend 254, wherein the different values of potassium are represented such that the field variability can be easily understood by viewing the map 250.

The map 200 depicts environmentally-adjusted critical level values of phosphorus, from 15-30 ppm, regardless of crop. The environmentally-adjusted critical level values of each cell (e.g., hexagrid) may be depicted. These values may be computed after the CEC portion of critical level is determined using a guideline formula such as the Tri-State formula discussed above. The map 200 may also take into account historical yield as discussed above.

The map 250 depicts environmentally-adjusted critical level values of potassium, from approximately 35-250 ppm, regardless of crop. The environmentally-adjusted critical level values of each cell (e.g., hexagrid) may be depicted. These values may be computed after the CEC portion of critical level is determined using a guideline formula such as the Tri-State formula discussed above. The map 250 may take into account historical yield as discussed above.

Advantageously, the map 200 and the map 250 provide growers, agronomists and others with information about fields that has never existed in conventional systems. In particular, the present techniques enable these parties to view the map 200 and the map 250 to gain an intuitive grasp of yearly/seasonal differences in soil moisture status throughout a growing season.

The map 200 and map 250 provide several advantages over conventional systems. First, a grower, agronomist, etc. may view the maps to gain an intuitive grasp of how the field is likely to fare (i.e., yield), at a sub-field level, in terms of the levels of nutrient in relation to critical levels. Further, the maps map be loaded into an agricultural prescription and used to systematically improve an agricultural crop at the sub-field level, improving upon industry standard static critical levels, instead providing a dynamic and completely customized sub-field rate application.

FIGS. 2A and 2B may correspond to shapefiles output by the application rate module 156 of FIG. 1, in some aspects. Specifically, the application rate module 156 may receive/retrieve sub-field level data. In some aspects, the sub-field level data may be associated with a field-level grid, such that each grid cell (e.g., one or more hexagonal subdivisions of the grid, referred to herein as hexagrids) includes respective measured values of the field.

As discussed, FIG. 2A and FIG. 2B, respectively, depict example 3D maps corresponding to an agricultural field. In FIGS. 2A and 2B, the Z-axis may represent field elevation. The Z axis may be augmented, such that while there appears to be great variability in elevation, true variability is less pronounced (e.g., 2 m of elevation change).

Figure 3A:
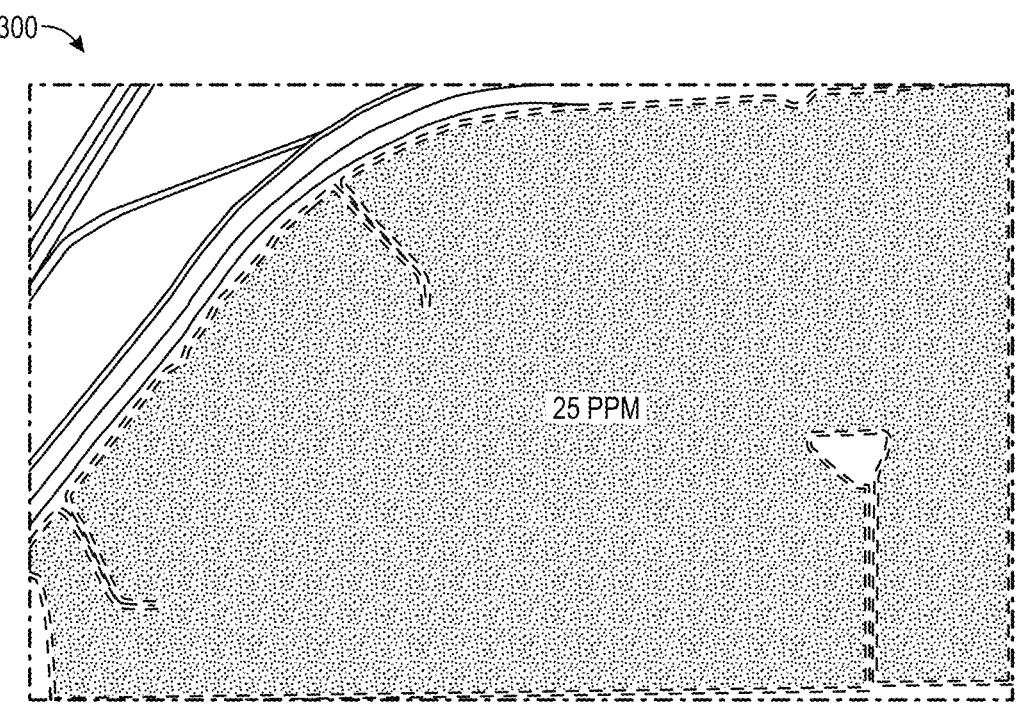
FIG. 3A depicts an industry-standard static critical level field map for phosphorus across every sub-field environment, regardless of water availability and diffusion rate, according to some aspects.

Additional visualizations, maps and/or data sets be generated by the application rate module 156, in some aspects. For example, FIG. 3A depicts an industry-standard static critical level field map 300 for phosphorus across every sub-field environment, regardless of water availability and diffusion rate. As indicated above, empirical testing has shown that by increasing the critical level slightly, and applying additional nutrient, may have a substantial positive impact on yield.

For example, the present techniques may include combining the topographic data of the spatial map 200 and/or the spatial map 250 with soil sample data to produce a spatial critical level map. For example, the spatial critical level map may include a grid for a field, wherein every grid has a respective spatial critical value including a respective spatial critical value of concentration of phosphorus the grid needs and a respective spatial critical value of potassium the grid cell needs to provide optimal yield outcomes at the end of the season. In another embodiment, the difference between the observed soil test levels and spatial critical levels may be computed and mapped to inform the agrilytics company, grower, or other user of the nutrient status (i.e., above or below the critical values) of a given field.

In the example of FIG. 2A and FIG. 2B, there is elevation change or slope change. At higher elevations, even if small changes (e.g., 7-8 feet or less) the soil by nature has a lower water holding capacity, and there are effects of gravity working against the plant. Specifically, gravity is pulling water down from higher elevations to the areas of lower elevation. As that process takes place, areas of higher elevation tend to have less water available to move the nutrient to the plant. Further, at higher elevations, the soil tends to be of higher bulk density, because that soil frequently contains greater amounts of clay, which has a smaller particle size and packs/compresses together to a higher degree.

This demonstrates in a slightly different way why the present spatial critical level techniques are an improvement to conventional models, which do not take plant available water variability due to gravity between elevations into account. As discussed, different areas in the field may be compensated for using a spatially variable fertilizer recommendation to counteract and mitigate potential yield losses.

In some aspects, the map layers 200 and 250 may be used to generate starter fertilizer recommendations, and/or for generating variable seeding recommendations.

Figure 3B:
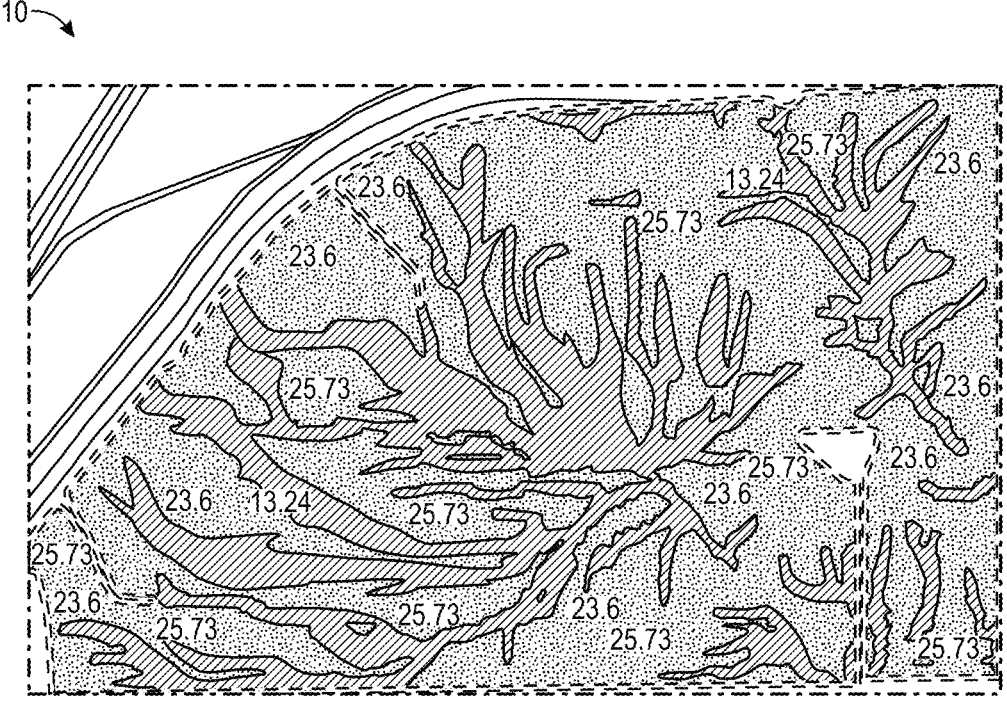
FIG. 3B depicts a spatial critical level field map for phosphorus based on environmental variability and sub-field water availability and diffusion rates, according to some aspects.

FIG. 3B depicts a spatial critical level field map 310 for phosphorus based on environmental variability and sub-field water availability and diffusion rates, according to some aspects.

Figure 3C:
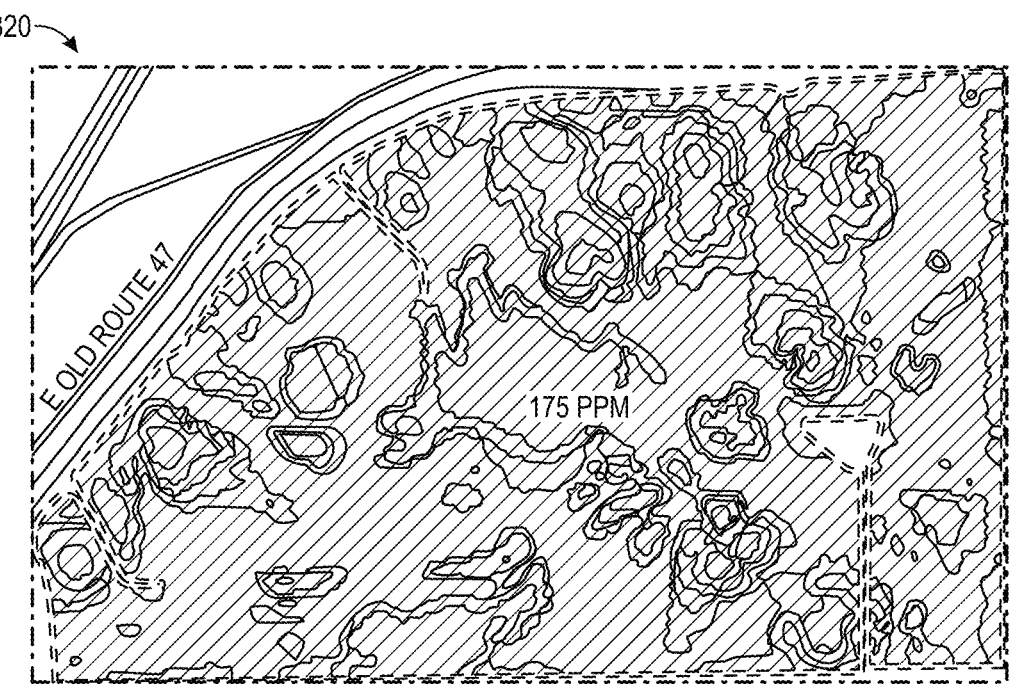
FIG. 3C depicts an industry-standard static critical level field map for potassium across every sub-field environment, regardless of water availability and diffusion rate, according to some aspects.

FIG. 3C depicts an industry-standard static critical level field map 320 for potassium across every sub-field environment, regardless of water availability and diffusion rate.

Figure 3D:
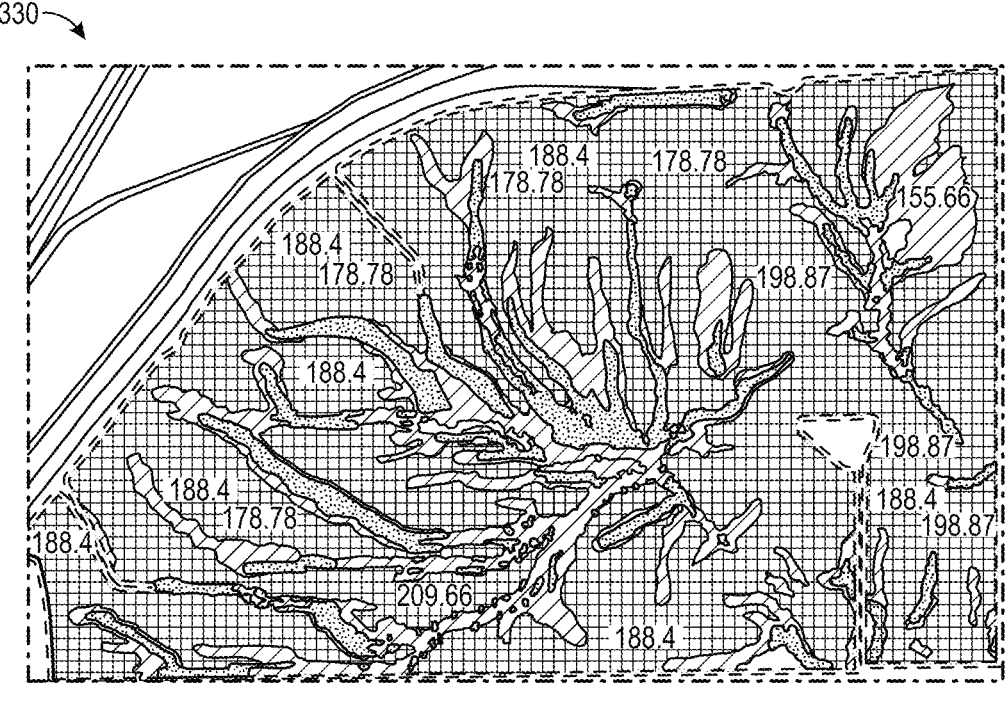
FIG. 3D depicts a spatial critical level field map for potassium based on environmental variability and sub-field water availability and diffusion rates, according to some aspects.

FIG. 3D depicts a spatial critical level field map 330 for potassium based on environmental variability and sub-field water availability and diffusion rates, according to some aspects.

As shown, considerable variability exists within the field map 310 of FIG. 3B and field map 330 of FIG. 3D. This evident variability is the result of the present techniques applying modified application rate recommendation guidelines at the hyper-local level, which is within sub-field regions (e.g., one or more hexagrids) that may be only a few meters across, respectively. When an entire field is coded in this way in a spatial data file, the emergent pattern is one in which variability is represented and clearly visible.

FIGS. 3A and 3C reflect the assumption, by Land Grant University recommendation equations, that there is a single critical level for phosphorus and one for potassium. Empirical testing has shown that this is not necessarily the case. For example, given dynamics of water movement or lack thereof in certain areas of the field, there needs to be different spatial critical levels in areas more prone to a limited plant available water supply. These areas may need higher critical values due to a lack of water moving nutrients to the plant. Thus, FIG. 3B and FIG. 3D reflect a more accurate picture of the necessity for variable critical levels within a sub-field regions of a field.

As discussed above, the present techniques may include computing a plurality of spatial critical levels for a field, wherein each spatial critical level corresponds to a grid cell within the field (i.e., a sub-field). The grid cells may be hexagrids, for example. Every grid cell may have a critical value indicative of that ability of the soil in that grid cell to supply nutrient given its water regime or plant available water characteristics.

FIG. 3B and FIG. 3D also show a highly advantageous sustainability improvement over conventional techniques. In particular, lower elevations are much closer to the water table and by not applying as much nutrient in those areas, the present techniques avoid over-applying nutrient in areas most at risk for leaching and other losses due to the close proximity of the water table.

SSURGO data may include depth to water table attributes quantifying how deep below the surface the water table is for areas of the field. In some aspects, this quantifiable data may be added to the digital model of the field, and one or more spatial maps based on the digital model.

Figure 4A:
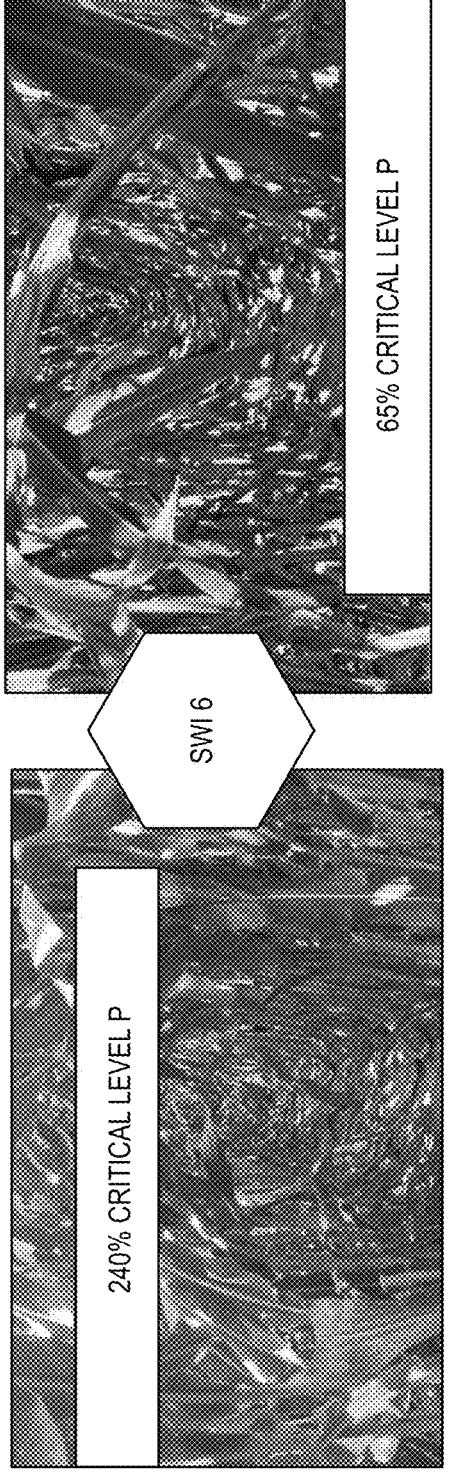
FIG. 4A depicts an exemplary canopy view of plants grown at a soil wetness index (SWI) of 6, according to some aspects.

FIG. 4A depicts an exemplary canopy view 400 of plants grown at a soil wetness index (SWI) of 6, wherein the plants are provided with a first level of phosphorus that is 240% of the critical level, and a second level of phosphorus that is 65% of the critical level. SWI is defined as a derivative of elevation, slope and specific catchment area of the landscape. SWI uses a scale of 1-20 to describe where water runs to and from, across the landscape surface. A SWI of 1-5 is considered water limited, whereas a SWI if 6-10 is considered stable and a SWI of 11-20 is considered saturated. The higher the SWI, the more water that is running to a specific area of a field.

Figure 4B:
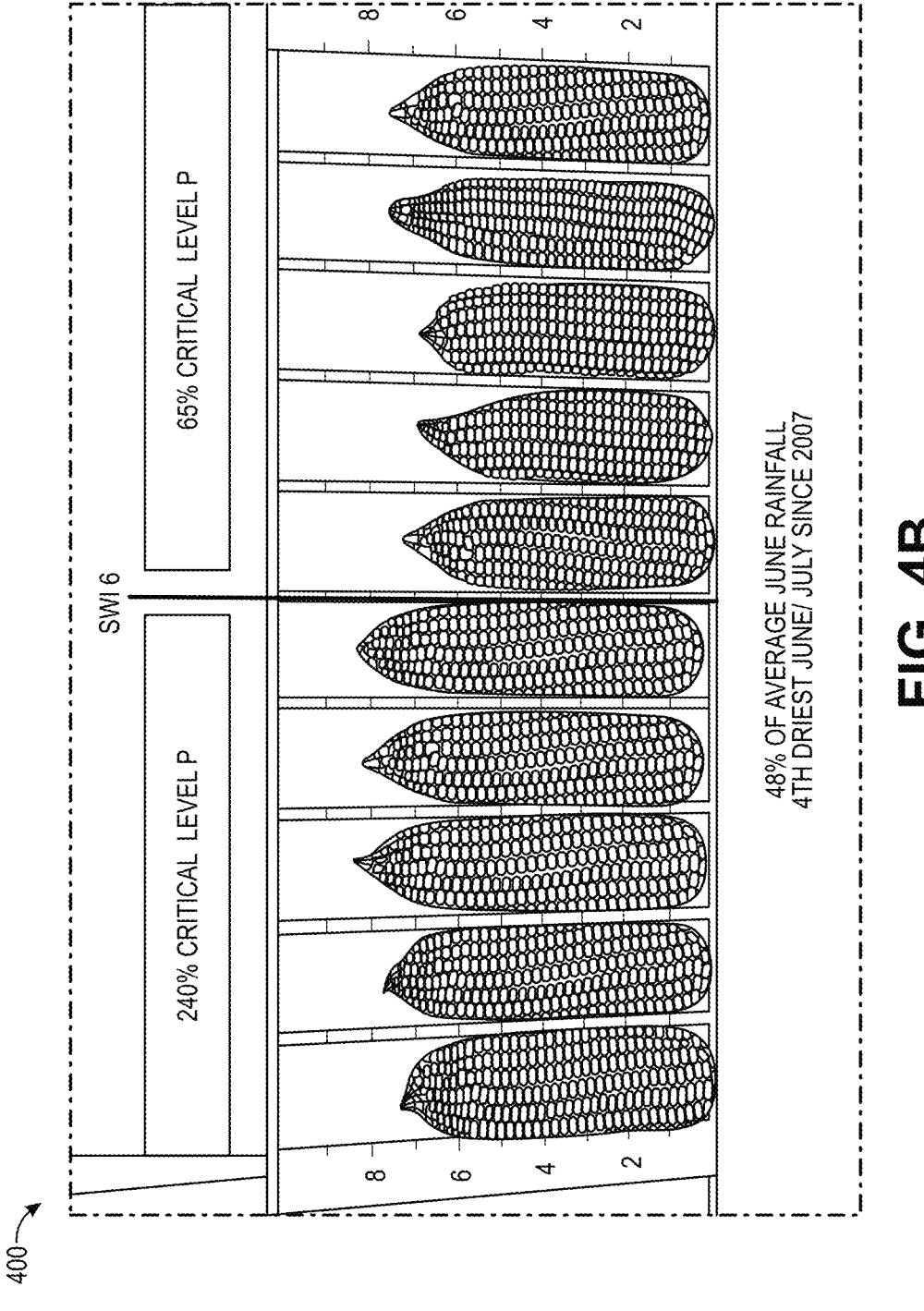
FIG. 4B depicts exemplary corn yield examples at the same relative phosphorus levels, and the same SWI (6), according to some aspects.

FIG. 4B depicts exemplary corn yield examples at the same relative phosphorus levels of FIG. 4A, and the same SWI (6). FIGS. 4A and 4B demonstrate ear samples and plant health/canopy differences in similar environments in a field with varying soil test phosphorus levels as a percentage of critical level for the specific environment/SWI value. Where the soil test level of phosphorus is 65% of the P critical value, the canopy exhibits reduced green leaf area and increase senescence. Where the soil test level of phosphorus exceeds the critical level, the canopy exhibits a greater amount of green leaf area and less light penetration through the canopy. Similarly, the corn ears are larger at the 240% level, and stunted at the 65% level.

Figure 5A:
FIG. 5A depicts an exemplary canopy view of plants grown at a soil wetness index (SWI) of 7, according to some aspects.

FIG. 5A depicts an exemplary canopy view 400 of plants grown at a soil wetness index (SWI) of 7, wherein the plants are provided with a first level of potassium that is 72% of the critical level, and a second level of potassium that is 95% of the critical level.

Figure 5B:
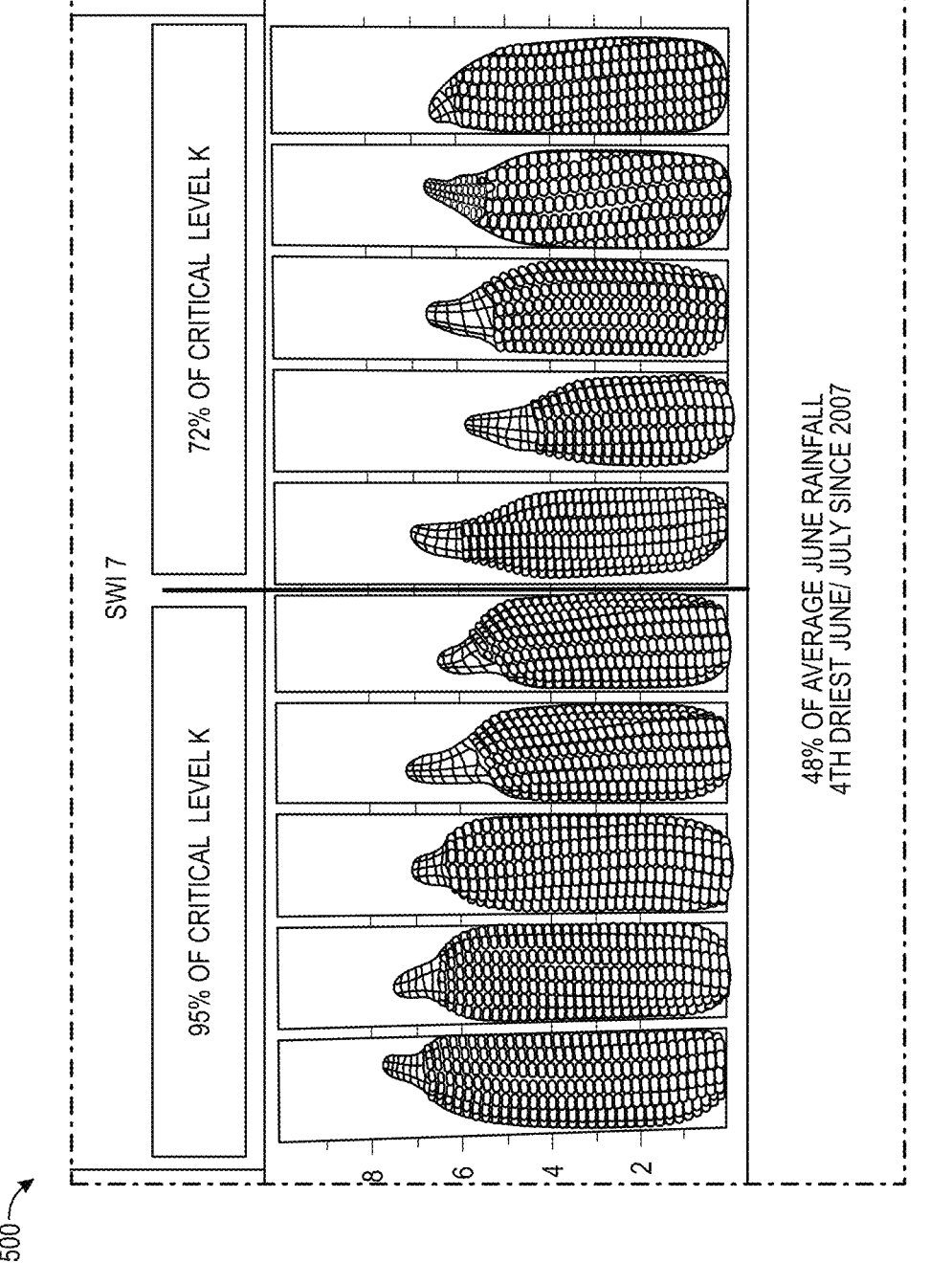
FIG. 5B depicts exemplary corn yield examples at the same relative potassium levels of FIG. 5A, and the same SWI, according to some aspects.

FIG. 5B depicts exemplary corn yield examples at the same relative potassium levels of FIG. 5A, and the same SWI. FIGS. 5A and 5B demonstrate corn ear samples and plant health differences in similar environments of a field with varying potassium levels as a percentage of critical level for that specific environment, wherein the SWI is 7. As shown in FIG. 5A, the canopy of the corn plant having the greater percentage of ideal critical level of potassium appears to be thriving, and the yields also appear to be increased for that plant, as shown in FIG. 5B.

Exemplary Computer-Implemented Reporting Aspects

In some aspects, a land management company that buys and sells farmland, for example, may have a large number of acres under management. The land management company may want to improve profitability of the land and may use outputs of the present techniques to do so. For example, the present techniques could be used to generate reporting for the land management company including a breakdown of grid cells or just sub-region of one or more fields that are below the critical level or above the critical level. Specifically, a reporting module (not depicted) may be part of the memory 142 of the server 106. That information could help the land management company to decide where to deploy limited resources, in order to have the biggest impact.

The only inputs that the land management company need provide to the computing environment 100 to receive such a report would be a field boundary and a soil test. The present techniques may receive, for example, LiDAR data corresponding to the field boundary. In some aspects, the present techniques maintain a database of fields in Midwest in the database 180. Based on this information, the present techniques may compute a map showing grid cells above or below critical levels, as discussed above, and provide the map in a tabular or spatial map/report.

Exemplary Computer-Implemented Method Aspects

Figure 6:
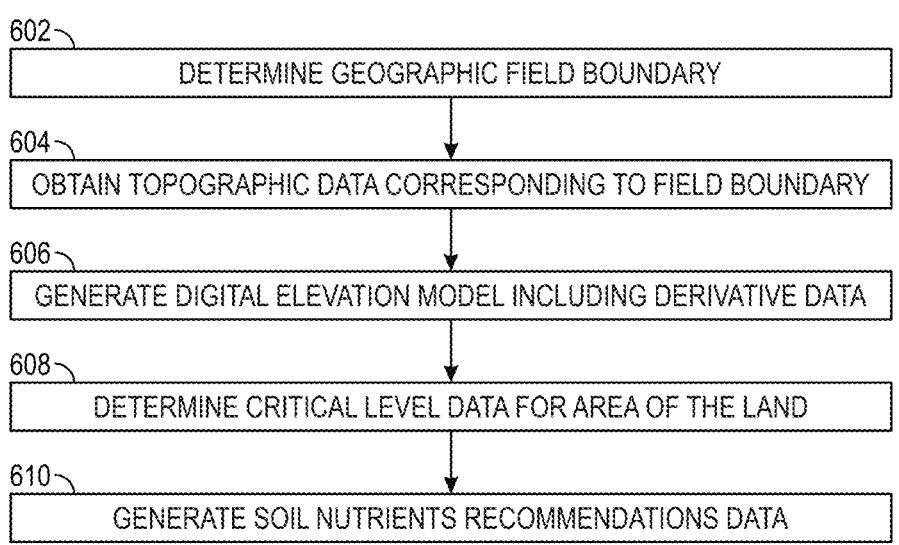
FIG. 6 depicts a flow diagram of an exemplary computer-implemented method for generating soil nutrients recommendation data, according to some aspects.

FIG. 6 depicts a flow diagram of an exemplary computer-implemented method 600 for generating soil nutrients recommendation data, according to some aspects. The method 600 may be performed by one or more elements of the environment 100 of FIG. 1, for example.

The method 600 may include determining, via one or more processors, a geographic field boundary of a field (block 602). Determining the field boundary may include receiving field boundary information, in some aspects.

The method 600 may include obtaining, via one or more processors, topographic data corresponding to the field boundary of the field (block 604).

The method 600 may include generating, based on the topographic data, a digital elevation model including derivative data corresponding to slope data, soil wetness index data, and catchment area data (block 606).

The method 600 may include determining, based on the derivative data, critical level data for the area of the land (block 608).

The method 600 may include generating, using a model that receives the critical level data as input, the soil nutrients recommendations data (block 610).

In some aspects, the method 600 may include generating soil nutrients recommendation data including one or more of a fertilizer recommendation, a plant density recommendation, or a planting location recommendation.

In some aspects, the method 600 may include obtaining, by one or more processors, plant data for one or more plants to be grown within the area of the land; and determining, via one or more processors, the critical level data for the area of the land is further based on the plant data for the one or more plants.

In some aspects, the method 600 may include applying a static model, such as one developed by a land grant university or government. For example, the static model may be the Tri-State Fertilizer Recommendation model. The static model may be used to generate soil nutrients recommendations (e.g., application rates per hexagrid).

In some aspects, the method 600 may include determining the topographic data based on predetermined data, such as LiDAR data sources, RTK data sources, etc. The predetermined data may be retrieved from an element of the environment 100 of FIG. 1 (e.g., the database 180) or an external element (e.g., an external API, database, or other resource).

In some aspects, the method 600 may include determining the critical level data for the area of the using a machine learning model that receives the derivative data as input and predicts, in multi-dimensional space, the movement of water within the geography defined by the field boundary.

In some aspects, the method 600 may include generating a report including at least one identification of an area of the field based on the critical level data. As discussed, such reports may be provided to land management firms, agronomists, growers or other interested parties in a human-readable format, to enable the reader to understand which areas of a given field (e.g., one or more regions including one or more respective hexagrids) require mitigation, fertilization, etc.

ADDITIONAL CONSIDERATIONS

The following considerations also apply to the foregoing discussion. Although the following text sets forth a detailed description of numerous different aspects, it should be understood that the legal scope of the invention may be defined by the words of the claims set forth at the end of this patent. The detailed description is to be construed as exemplary only and does not describe every possible aspect, as describing every possible aspect would be impractical, if not impossible. One could implement numerous alternate aspects, using either current technology or technology developed after the filing date of this patent, which would still fall within the scope of the claims.

Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112 (f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computing system for visualizing soil nutrients recommendations data, the computing system comprising:
   one or more processors; and
   a memory having instructions stored thereon that, when executed by the one or more processors, cause the computing system to:
   determine, based on derivative data included in a digital elevation model corresponding to an area of land within a geographic field boundary, critical level data comprising a plurality of spatial critical levels, each spatial critical level corresponding to a grid cell within the geographic field boundary, wherein the derivative data corresponds to slope data, soil wetness index data and catchment area data;
   generate, based on the critical level data, a spatial critical level map for the area of land;
   generate, using a model that receives the critical level data as input, the soil nutrients recommendations data;
   cause the spatial critical level map and the soil nutrients recommendations data to be displayed on a graphical user interface of an output device; and
   generate an agricultural prescription based on the spatial critical level map and the soil nutrients recommendations data.

2. The computing system of claim 1, wherein the soil nutrients recommendations data includes one or more of:
   a fertilizer recommendation, a plant density recommendation, or a planting location recommendation.

3. The computing system of claim 1, the memory having stored thereon instructions that when executed, cause the computing system to:
   obtain plant data for one or more plants to be grown within the area of the land; and
   determine the critical level data for the area of the land based on the plant data for the one or more plants.

4. The computing system of claim 1, wherein the model is the Tri-State Fertilizer Recommendation model.

5. The computing system of claim 1, wherein the topographic data is (i) obtained via one or more of LiDAR data sources or RTK data sources and (ii) represented as hexagrids.

6. The computing system of claim 1, the memory having stored thereon instructions that when executed, cause the computer computing system to:
   determine the critical level data for the area of the field using a machine learning model that receives the derivative data as input and predicts water movement within the field.

7. The computing system of claim 1, the memory having stored thereon instructions that when executed, cause the computing system to:
   generate a report including at least one identification of an area of the field based on the critical level data.

8. A computer-implemented method for visualizing soil nutrients recommendations data, the method comprising:
   determining, based on derivative data included in a digital elevation model corresponding to an area of land within a geographic field boundary, critical level data comprising a plurality of spatial critical levels, each spatial critical level corresponding to a grid cell within the geographic field boundary, wherein the derivative data corresponds to slope data, soil wetness index data, and catchment area data;

generating, based on the critical level data, a spatial critical level map for the area land;

generating, using a model that receives the critical level data as input, the soil nutrients recommendations data;

causing the spatial critical level map and the soil nutrients recommendations data to be displayed on a graphical user interface of an output device; and generating an agricultural prescription based on the spatial critical level map and the soil nutrients recommendations data.

9. The computer-implemented method of claim 8, wherein the soil nutrients recommendations data includes one or more of:

a fertilizer recommendation, a plant density recommendation, or a planting location recommendation.

10. The computer-implemented method of claim 8, further comprising:

obtaining, by one or more processors, plant data for one or more plants to be grown within the area of the land; and determining the critical level data for the area of the land is further based on the plant data for the one or more plants.

11. The computer-implemented method of claim 8, wherein the model is the Tri-State Fertilizer Recommendation model.

12. The computer-implemented method of claim 8, wherein the topographic data is (i) obtained via one or more of LiDAR data sources or RTK data sources and (ii) represented as hexagrids.

13. The computer-implemented method of claim 8, further comprising:

determining the critical level data for the area of the using a machine learning model that receives the derivative data as input and predicts water movement within the field.

14. The computer-implemented method of claim 8, further comprising:

generating a report including at least one identification of an area of the field based on the critical level data.

15. A non-transitory computer readable medium containing program instructions that when executed by one or more processors, cause a computer to:

determine, based on derivative data included in a digital elevation model corresponding to an area of land within a geographic field boundary, critical level data comprising a plurality of spatial critical levels, each spatial critical level corresponding to a grid cell within the geographic field boundary, wherein the derivative data corresponds to slope data, soil wetness index data, and catchment area data;

generate, based on the critical level data, a spatial critical level map for the area of land;

generate, using a model that receives the critical level data as input, soil nutrients recommendations data;

cause the spatial critical level map and the soil nutrients recommendations data to be displayed on a graphical user interface of an output device; and generate an agricultural prescription based on the spatial critical level map and the soil nutrients recommendations data.

16. The non-transitory computer readable medium of claim 15, wherein the soil nutrients recommendations data includes one or more of a fertilizer recommendation, a plant density recommendation, or a planting location recommendation.

17. The non-transitory computer readable medium of claim 15, including further instructions that, when executed by one or more processors, cause a computer to:

obtain plant data for one or more plants to be grown within the area of the land; and determine the critical level data for the area of the land based on the plant data for the one or more plants.

18. The non-transitory computer readable medium of claim 15, wherein the topographic data is (i) obtained via one or more of LiDAR data sources or RTK data sources and (ii) represented as hexagrids.

19. The non-transitory computer readable medium of claim 15, including further instructions that, when executed by one or more processors, cause a computer to:

determine the critical level data for the area of the field using a machine learning model that receives the derivative data as input and predicts water movement within the field.

20. The non-transitory computer readable medium of claim 15, including further instructions that, when executed by one or more processors, cause a computer to:

generate a report including at least one identification of an area of the field based on the critical level data.

* * * * *